(12) United States Patent
Wang et al.

(10) Patent No.: US 9,077,495 B2
(45) Date of Patent: Jul. 7, 2015

(54) METHOD, SYSTEM AND DEVICE FOR TRANSMITTING DEMODULATION REFERENCE SIGNAL AND DEMODULATING CHANNEL OVER BACKHAUL LINK

(75) Inventors: Libo Wang, Beijing (CN); Xueming Pan, Beijing (CN); Guojun Xiao, Beijing (CN); Deshan Miao, Beijing (CN); Wenjian Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 414 days.

(21) Appl. No.: 13/499,250

(22) PCT Filed: Sep. 28, 2010

(86) PCT No.: PCT/CN2010/077390
§ 371 (c)(1),
(2), (4) Date: Mar. 29, 2012

(87) PCT Pub. No.: WO2011/038670
PCT Pub. Date: Apr. 7, 2011

(65) Prior Publication Data
US 2012/0188937 A1 Jul. 26, 2012

(30) Foreign Application Priority Data
Sep. 29, 2009 (CN) .......................... 2009 1 0235261

(51) Int. Cl.
*H04B 7/14* (2006.01)
*H04W 4/00* (2009.01)
(Continued)

(52) U.S. Cl.
CPC ............. *H04L 5/0048* (2013.01); *H04W 48/08* (2013.01); *H04W 72/0453* (2013.01); *H04W 84/047* (2013.01); *H04B 7/15542* (2013.01)

(58) Field of Classification Search
None
See application file for complete search history.

(56) References Cited

U.S. PATENT DOCUMENTS

2012/0114021 A1* 5/2012 Chung et al. .................. 375/211
2012/0155561 A1* 6/2012 Seo et al. ...................... 375/260

FOREIGN PATENT DOCUMENTS

CN 101222272 A 7/2008
(Continued)

OTHER PUBLICATIONS

Seo et al., "Reference signal Management Method in Backhaul Link", U.S. Appl. No. 61/235,322 of Seo et al. (US 20120155561, Aug. 2009.*
Chung et al., "Transmission Mode Configuration Methods for Relay Backhaul Downlink Control and Data Transmission", U.S. Appl. No. 61/225,206 of Chung et al. (US 20120114021), Jul. 2009.*
Chung et al., "Downlink RS for Relay Node", U.S. Appl. No. 61/226,285 of Chung et al. (US 20120114021), Jul. 2009.*
(Continued)

*Primary Examiner* — Faruk Hamza
*Assistant Examiner* — Thinh Tran
(74) *Attorney, Agent, or Firm* — Blakely, Sokoloff, Taylor & Zafman LLP

(57) ABSTRACT

The present invention discloses a method on a Long Term Evolution-Advanced (LTE-A) system backhaul link for demodulation pilot transmission, wherein the method includes that: among the resource areas occupied by a Relay-Physical Downlink Shared Channel (R-PDSCH) on the backhaul link, a base station selects the resource units which are preconfigured for sending the demodulation pilot signal of the R-PDSCH; the base station sends the demodulation pilot signal to a Relay Node (RN) belonging to the base station by using the selected resource units. The present invention also discloses a channel demodulation method on the LTE-A system backhaul link, an LTE-A communication system and device. The demodulation performance of the R-PDSCH in the LTE-A system can be ensured with the present invention.

12 Claims, 9 Drawing Sheets

(51) Int. Cl.
*H04B 7/216* (2006.01)
*H04L 5/00* (2006.01)
*H04W 72/04* (2009.01)
*H04W 48/08* (2009.01)
*H04W 84/04* (2009.01)
*H04B 7/155* (2006.01)

(56) References Cited

FOREIGN PATENT DOCUMENTS

| CN | 101534265 A | 9/2009 |
|---|---|---|
| EP | 2 077 692 A2 | 7/2009 |
| WO | WO 2009/052363 A2 | 4/2009 |

OTHER PUBLICATIONS

Zte, "Considerations on Demodulation Reference Signal in Backhaul Downlink", TSG-RAN WG1 #58, Aug. 2009.*
PCT International Search Report for PCT Counterpart Application No. PCT/CN2010/077390 containing Communication relating to the Results of the International Search Report, 8 pgs., (Dec. 30, 2010).
3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.7.0, 3 pages, (May 2009).
3GPP, "3rd Generation Partnership Project; Technical Specification Group Radio Access Network; Feasibility Study for Further Advancement for E-UTRA (LTE-Advanced) (Release 9)", 3GPP TR 36.912 V9.0.0, 9 pages, (Sep. 2009).

* cited by examiner

--Prior Art--

--Prior Art--

METHOD, SYSTEM AND DEVICE FOR TRANSMITTING DEMODULATION REFERENCE SIGNAL AND DEMODULATING CHANNEL OVER BACKHAUL LINK

CROSS-REFERENCE TO RELATED APPLICATIONS

The present application is a US National Stage of International Application No. PCT/CN2010/077390, filed 28 Sep. 2010, designating the United States, and claiming priority to Chinese Patent Application No. 200910235261.0, filed 29 Sep. 2009.

FIELD OF THE INVENTION

The present invention relates to the field of radio communications and particularly to a method, system and device for transmitting a demodulation reference signal and demodulating a channel over a backhaul link.

BACKGROUND OF THE INVENTION

As illustrated in FIG. 1, which is a network structure of a Long Term Evolution-Advanced (LTE-A) system, an eNodeB (eNB) is connected to a Core Network (CN) via a wired interface, a Relay Node (RN) is connected to the eNB via a radio interface, and a User Equipment (UE) is connected to the RN or the eNB via a radio interface.

A communication link between the RN and the eNB is referred to as a backhaul link, and a link between the RN and the UE is referred to as an access link.

The following two channels are defined in the LTE-A system:

a Relay-Physical Downlink Control Channel (R-PDCCH) is a control channel over which the eNB transmits data to the RN over the backhaul link; and a Relay-Physical Downlink Shared Channel (R-PDSCH) is a physical shared channel over which the eNB transmits data to the RN over the backhaul link.

For a common R-PDCCH, a common reference signal, instead of a dedicated reference signal (DRS), has to be provided to a plurality of RNs for use in demodulation and currently occupies resource locations as illustrated in FIG. 2. The RN has to demodulate data over the R-PDSCH with a demodulation reference signal (DMRS).

In FIG. 2, the first three columns in a timeslot 1 form a Physical Downlink Control Channel (PDCCH) zone, an R-PDCCH zone includes the fourth and fifth columns, or the fourth, fifth and sixth columns, or the fourth, fifth, sixth and seventh columns in the timeslot 1, and an R-PDSCH zone includes all of columns in a timeslot 2 and unoccupied columns in the timeslot 1.

The inventors have identified, during making of the invention, the following technical problem in the prior art.

In the LTE-A system, the eNodeB transmits no demodulation reference signal (DMRS) in the R-PDSCH zone so that the RN can not perform channel estimation on the R-PDSCH with a demodulation reference signal and consequently can not receive correctly data over the R-PDSCH.

SUMMARY OF THE INVENTION

Embodiments of the invention provide a method for transmitting a demodulation reference signal over a backhaul link and an eNodeB so as to address such a problem in the existing LTE-A system that a demodulation reference signal of an R-PDSCH can not be transmitted.

A method for transmitting a demodulation reference signal over a backhaul link in a Long Term Evolution-Advanced (LTE-A) system includes:

selecting, by an eNodeB in a resource zone occupied by a Relay-Physical Downlink Shared Channel (R-PDSCH) over the backhaul link, preconfigured resource units for transmission of a demodulation reference signal of the R-PDSCH; and transmitting, by the eNodeB, the demodulation reference signal to a Relay Node (RN) subordinated to the eNodeB in the selected resource units.

An eNodeB includes:

a resource selecting unit configured to select, in a resource zone occupied by a Relay-Physical Downlink Shared Channel (R-PDSCH) over a backhaul link, preconfigured resource units for transmission of a demodulation reference signal of the R-PDSCH; and a demodulation reference signal transmitting unit configured to transmit the demodulation reference signal to a Relay Node (RN) subordinated to the eNodeB in the resource units selected by the resource selecting unit.

Embodiments of the invention further provide a method for demodulating a channel over a backhaul link, an LTE-A communication system and a relay node so as to address such a problem in the existing LTE-A system that an RN can not receive correctly data over an R-PDSCH.

A method for demodulating a channel over a backhaul link in a Long Term Evolution-Advanced (LTE-A) system includes:

determining, by a Relay Node (RN), locations of resource units in which an eNodeB transmits a demodulation reference signal of a Relay-Physical Downlink Shared Channel, R-PDSCH, and which are located in a resource zone occupied by the R-PDSCH, and receiving the demodulation reference signal at the locations; and performing, by the RN, channel estimation with the demodulation reference signal and demodulating the R-PDSCH with the result of channel estimation.

A relay node includes:

a resource location determining unit configured to determine locations of resource units in which an eNodeB transmits a demodulation reference signal of a Relay-Physical Downlink Shared Channel (R-PDSCH) and which are located in a resource zone occupied by the R-PDSCH;

a demodulation reference signal receiving unit configured to receive the demodulation reference signal at the locations of the resource units; and a channel demodulating unit configured to perform channel estimation with the demodulation reference signal and demodulate the R-PDSCH with the result of channel estimation.

A Long Term Evolution-Advanced (LTE-A) communication system includes:

an eNodeB configured to select, in a resource zone occupied by a Relay-Physical Downlink Shared Channel (R-PDSCH) over a backhaul link, preconfigured resource units for transmission of a demodulation reference signal of the R-PDSCH, and transmit the demodulation reference signal to a Relay Node (RN) subordinated to the eNodeB in the selected resource units; and the relay node configured to receive the demodulation reference signal over the resource units, perform channel estimation with the demodulation reference signal and demodulate the R-PDSCH with the result of channel estimation.

In the invention, an eNodeB selects, in a resource zone occupied by an R-PDSCH, preconfigured resource units for transmission of a demodulation reference signal of the R-PDSCH and transmits the demodulation reference signal of the R-PDSCH to an RN subordinated to the eNodeB in the selected resource units, and the RN receives the demodulation reference signal of the R-PDSCH in the resource units, performs channel estimation with the demodulation reference signal and demodulates the R-PDSCH with the result of channel estimation, thereby ensuring that the RN can demodulate correctly data over the R-PDSCH for the purpose of receiving correctly the R-PDSCH.

DETAILED DESCRIPTION OF THE EMBODIMENTS

In order to enable an RN to receive correctly data over an R-PDSCH, an embodiment of the invention provides a method for transmitting a demodulation reference signal over a backhaul link in an LTE-A system, and in this method, an eNodeB transmits a demodulation reference signal of the R-PDSCH to the RN in resource units in a resource zone occupied by the R-PDSCH, and the RN demodulates the R-PDSCH upon reception of the demodulation reference signal.

Figure 1:
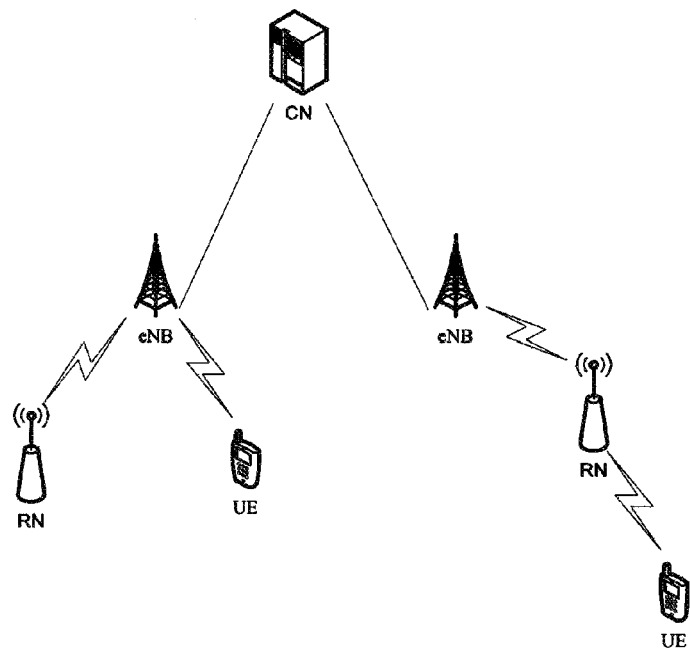
FIG. 1 is a schematic structural diagram of an LTE-A system in the prior art.
Figure 2:
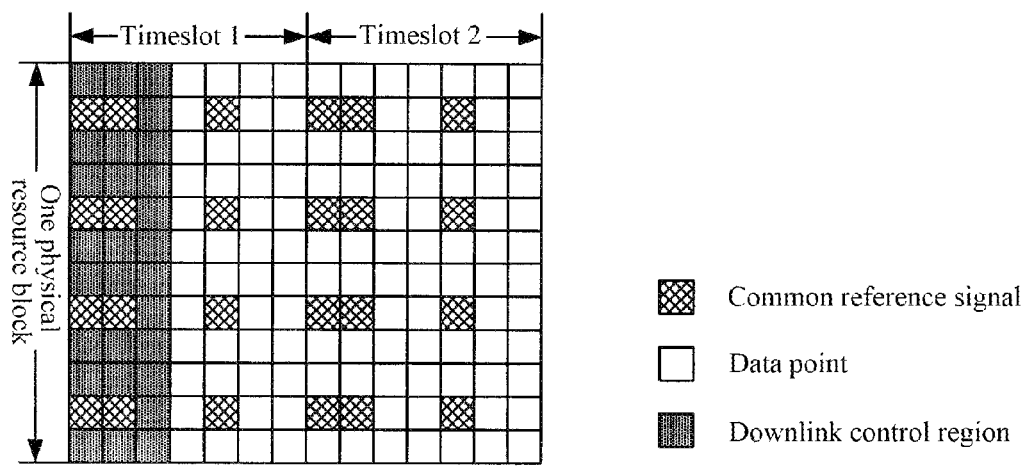
FIG. 2 is a schematic diagram of common reference signal configuration in the prior art.
Figure 3:
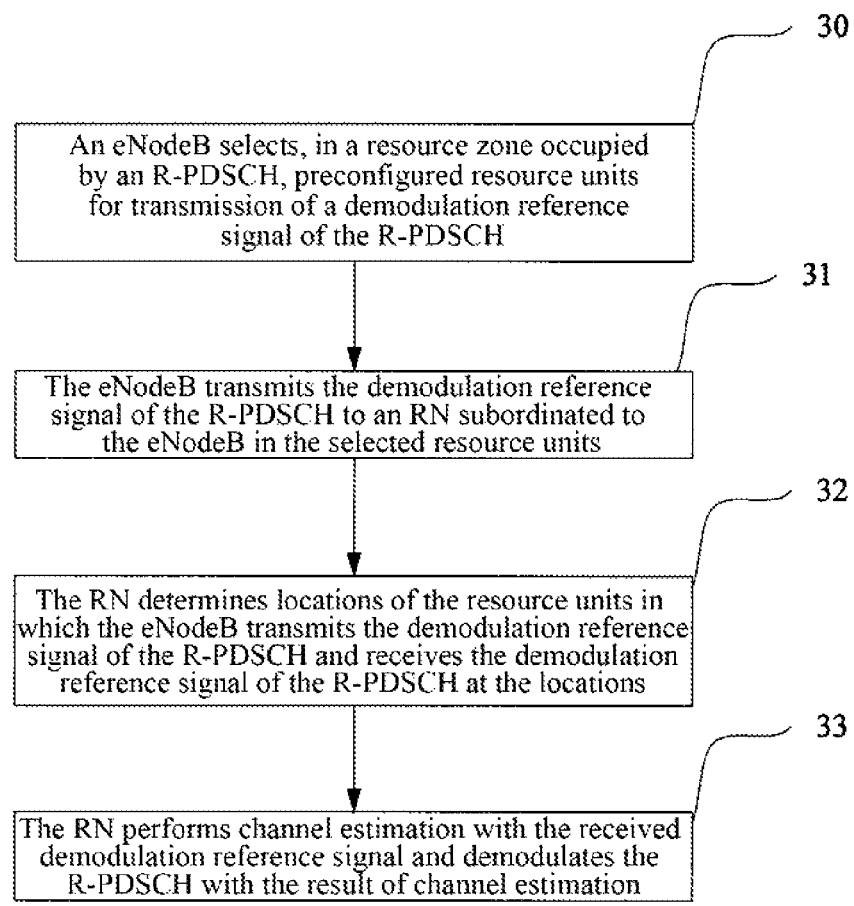
FIG. 3 is a schematic flow chart according to an embodiment of the invention.

Referring to FIG. 3, a method for transmitting a demodulation reference signal over a backhaul link in an LTE-A system according to an embodiment of the invention includes the following operations.

Operation 30: An eNodeB selects, in a resource zone occupied by an R-PDSCH, preconfigured resource units for transmission of a demodulation reference signal of the R-PDSCH.

Operation 31: The eNodeB transmits the demodulation reference signal of the R-PDSCH to an RN subordinated to the eNodeB in the selected resource units.

Operation 32: The RN determines locations of the resource units in which the eNodeB transmits the demodulation reference signal of the R-PDSCH and receives the demodulation reference signal of the R-PDSCH at the locations.

Operation 33: The RN performs channel estimation with the received demodulation reference signal and demodulates the R-PDSCH with the result of channel estimation.

In the operation 30, the resource units for transmission of the demodulation reference signal of the R-PDSCH may be configured in a method including the following operations.

The operation 1 is to determine the resource zone occupied by the R-PDSCH.

The operation 2 is to select resource units in the resource zone, which are neither occupied by a common reference signal nor located at a last Orthogonal Frequency Division Multiplexing (OFDM) symbol of the resource zone.

The operation 3 is to configure the selected resource units as the resource units for transmission of the demodulation reference signal of the R-PDSCH.

The operation 2 may be performed in the following three modes dependent upon a different multiplex mode adopted for the demodulation reference signal and a different resource zone occupied by the R-PDSCH.

In a first mode, if the Code Division Multiplexing-Frequency (CDM-F) mode is adopted for the demodulation reference signal of the R-PDSCH, firstly the resource zone of the R-PDSCH is searched for resource units in an LTE system for transmission of the demodulation reference signal, and then the located resource units are selected as the resource units in the resource zone, which are neither occupied by a common reference signal nor located at a last OFDM symbol of the resource zone.

In this mode, the configured resource units for transmission of the demodulation reference signal of the R-PDSCH include resource units constituted of the third OFDM symbols in the second timeslot of a sub-frame where the resource zone occupied by the R-PDSCH is located.

In a second mode, if the Code Division Multiplexing-Time (CDM-T) mode is adopted for the demodulation reference signal of the R-PDSCH and the number of OFDM symbols covered by a resource zone occupied by an R-PDCCH is less than or equal to 2, firstly the resource zone occupied by the R-PDSCH is searched for resource units in an LTE system for transmission of the demodulation reference signal, then the located resource units at the last two OFDM symbols of the resource zone occupied by the R-PDSCH are translated onto resource units in the resource zone, which are not occupied by a common reference signal, and finally the located resource units at the first two OFDM symbols of the resource zone occupied by the R-PDSCH and the translated resource units are selected as the resource units in the resource zone of the R-PDSCH, which are neither occupied by a common reference signal nor located at the last OFDM symbol of the resource zone.

In this mode, the configured resource units for transmission of the demodulation reference signal of the R-PDSCH include resource units constituted of the sixth OFDM symbols and the seventh OFDM symbols in the first timeslot of a sub-frame where the resource zone occupied by the R-PDSCH is located, and resource units constituted of the third OFDM symbols and the fourth OFDM symbols in the second timeslot of the sub-frame.

In a third mode, if the CDM-T mode is adopted for the demodulation reference signal of the R-PDSCH and the number of OFDM symbols covered by a resource zone occupied by an R-PDCCH is larger than 2, firstly the resource zone occupied by the R-PDSCH is searched for resource units in an LTE system for transmission of the demodulation reference signal, then the located resource units at the last two OFDM symbols of the resource zone occupied by the R-PDSCH are translated onto resource units in the resource zone, which are not occupied by a common reference signal, and finally the translated resource units are selected as the resource units in the resource zone of the R-PDSCH, which are neither occupied by a common reference signal nor located at the last OFDM symbol of the resource zone.

In this mode, the configured resource units for transmission of the demodulation reference signal of the R-PDSCH include resource units constituted of the third OFDM symbols and the fourth OFDM symbols in the second timeslot of a sub-frame where the resource zone occupied by the R-PDSCH is located.

Preferably, the eNodeB may transmit the demodulation reference signal to the RN over a part but not all of the selected resource units at a preset value of the density of reference signals in the operation 31 in order to lower redundancy of the system while ensuring demodulation performance thereof.

In the operation 32, the RN determines the locations of the resource units in which the eNodeB transmits the demodulation reference signal of the R-PDSCH in the following three modes corresponding to the three modes in which the resource units are configured at the eNodeB side.

In a first mode, if the CDM-F mode is adopted for the demodulation reference signal of the R-PDSCH, the RN firstly locates, in the resource zone occupied by the R-PDSCH, resource units in an LTE system for transmission of the demodulation reference signal, and then determines the locations of the resource units as the locations of the resource units in which the eNodeB transmits the demodulation reference signal of the R-PDSCH.

In a second mode, if the CDM-T mode is adopted for the demodulation reference signal of the R-PDSCH and the number of OFDM symbols covered by a resource zone occupied by an R-PDCCH is less than or equal to 2, the RN firstly locates, in the resource zone occupied by the R-PDSCH, resource units in an LTE system for transmission of the demodulation reference signal, then translates the located resource units at the last two OFDM symbols of the resource zone occupied by the R-PDSCH onto resource units in the resource zone, which are not occupied by a common reference signal, and finally determines the locations of the located resource units at the first two OFDM symbols of the resource zone occupied by the R-PDSCH and the translated resource units as the locations of the resource units in which the eNodeB transmits the demodulation reference signal of the R-PDSCH.

In a third mode, if the CDM-T mode is adopted for the demodulation reference signal of the R-PDSCH and the number of OFDM symbols covered by a resource zone occupied by an R-PDCCH is larger than 2, the RN firstly locates, in the resource zone occupied by the R-PDSCH, resource units in an LTE system for transmission of the demodulation reference signal, then translates the located resource units at the last two OFDM symbols of the resource zone occupied by the R-PDSCH onto resource units in the resource zone, which are not occupied by a common reference signal, and finally determines the locations of the translated resource units as the locations of the resource units in which the eNodeB transmits the demodulation reference signal of the R-PDSCH.

Preferably, the RN receives the demodulation reference signal of the R-PDSCH at the determined locations of the resource units in the operation 33 by receiving the demodulation reference signal of the R-PDSCH in a part but not all of the determined resource units in response to an instruction of the eNodeB or under a stored demodulation reference signal point configuration rule.

Apparently in the invention, a DMRS in an R-PDSCH zone is transmitted for demodulation of an R-PDSCH, and if there is no DMRS available in the R-PDSCH zone, a corresponding DMRS is translated in the time domain to ensure presence of a DMRS in the R-PDSCH zone for demodulation.

The method of the invention will be described below in particular embodiments.

The First Embodiment

Figure 4A:
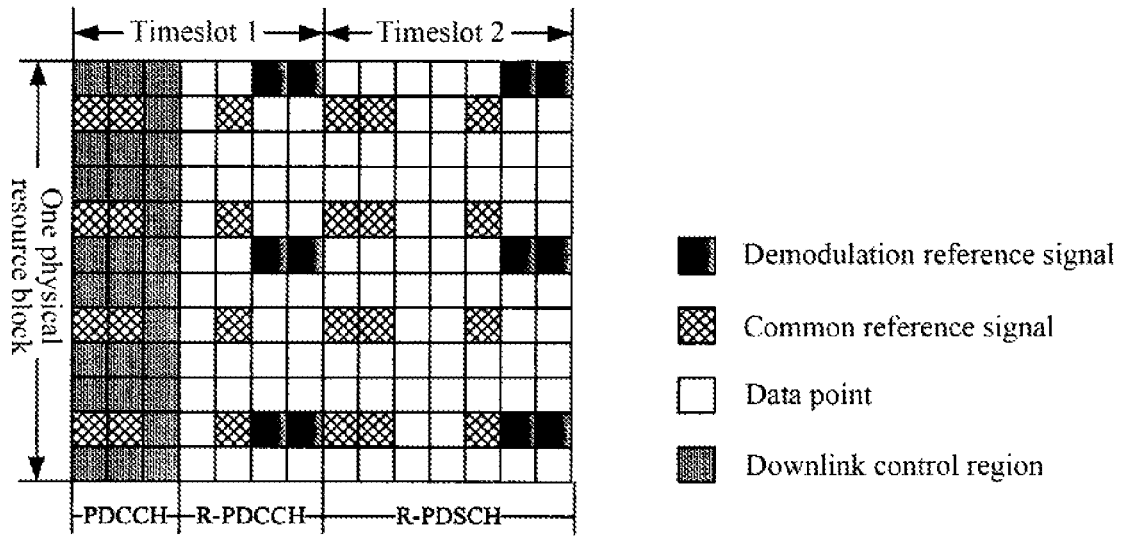
FIG. 4A is a schematic diagram of reference signal configuration in an LTE system according to a first embodiment of the invention.

As illustrated in FIG. 4A, which is a schematic diagram of demodulation reference signal configuration in the CDM-T mode in an LTE system, the CDM-T mode is adopted for a demodulation reference signal of an R-PDSCH, there are four OFDM symbols occupied by an R-PDCCH, and the second timeslot in the sub-frame is occupied by the R-PDSCH in the present embodiment.

Figure 4B:
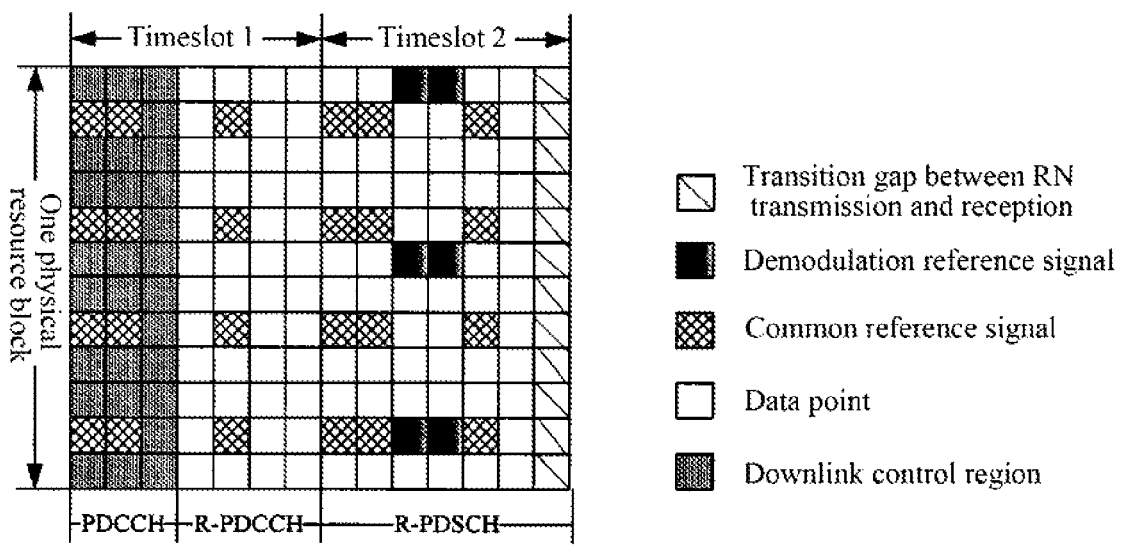
FIG. 4B is a schematic diagram of reference signal configuration in an LTE-A system according to the first embodiment of the invention.

The operation S01 is to firstly search a resource zone occupied by the R-PDSCH for resource units in the LTE system for transmission of the demodulation reference signal, which are the last two columns of resource units in the second timeslot, then translate the last two columns of resource units forward onto the third and the fourth OFDM symbols in the second timeslot, and finally configure the third and the fourth OFDM symbols in the second timeslot as resource units for transmission of a demodulation reference signal of the R-PDSCH, as illustrated in FIG. 4B.

In the operation S02, an eNodeB transmits the demodulation reference signal of the R-PDSCH to an RN in the configured resource units.

In the operation S03, the RN receives the demodulation reference signal of the R-PDSCH in the third and the fourth OFDM symbols in the second timeslot in the sub-frame, performs channel estimation with the demodulation reference signal and demodulates data over the R-PDSCH with the result of channel estimation.

Apparently CDM-T DMRS in two adjacent columns can be located in the middle of the R-PDSCH zone after being translated, thus the DMRS in the middle of the R-PDSCH zone can ensure demodulation performance of the R-PDSCH when the RN moves at a low speed or is immobile.

The Second Embodiment

Figure 5:
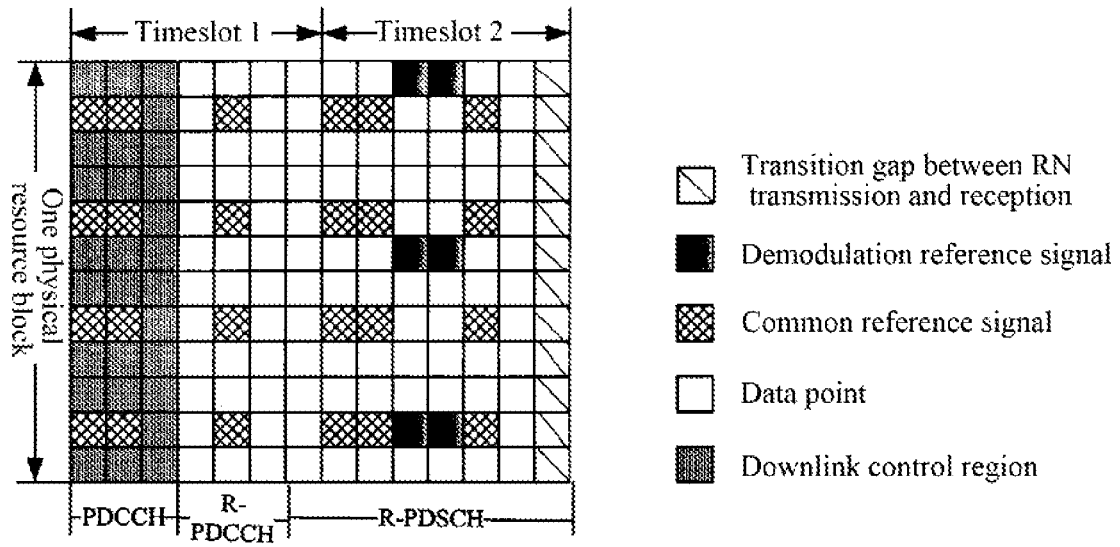
FIG. 5 is a schematic diagram of reference signal configuration according to a second embodiment of the invention.

The CDM-T mode is adopted for a demodulation reference signal of an R-PDSCH, there are three OFDM symbols occupied by an R-PDCCH, and the second timeslot and the last OFDM symbols in the first timeslot in the sub-frame are occupied by the R-PDSCH in the present embodiment; and as illustrated in FIG. 5, the result of configuring resource units for transmission of the demodulation reference signal of the R-PDSCH is the same as in the first embodiment, and for a specific flow thereof, reference can also be made to the first embodiment.

The Third Embodiment

The CDM-T mode is adopted for a demodulation reference signal of an R-PDSCH, there are two OFDM symbols occupied by an R-PDCCH, and the second timeslot and the last two OFDM symbols in the first timeslot in the sub-frame are occupied by the R-PDSCH in the present embodiment.

Figure 6:
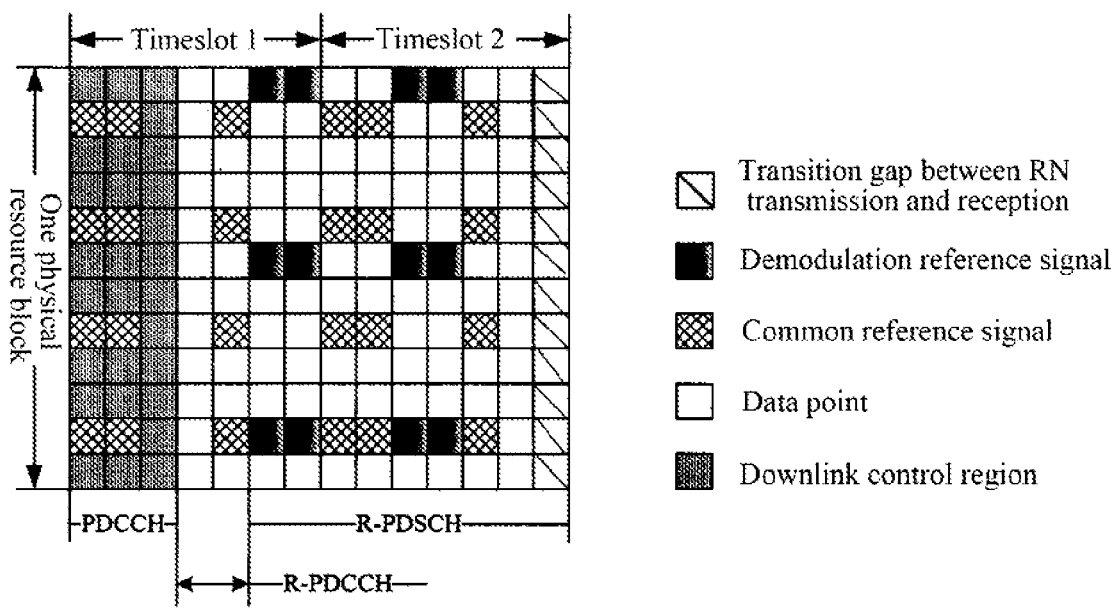
FIG. 6 is a schematic diagram of reference signal configuration according to a third embodiment of the invention.

The operation S11 is to firstly search a resource zone occupied by the R-PDSCH for resource units in an LTE system for transmission of the demodulation reference signal, which are the last two columns of resource units in the first timeslot and the last two columns of resource units in the second timeslot, then translate the last two columns of resource units in the second timeslot forward onto the third and the fourth OFDM symbols in the second timeslot, and finally configure the last two columns of resource units in the first timeslot and the third and the fourth OFDM symbols in the second timeslot as resource units for transmission of the demodulation reference signal of the R-PDSCH, as illustrated in FIG. 6.

In the operation S12, an eNodeB transmits the demodulation reference signal of the R-PDSCH to an RN in the configured resource units.

In the operation S13, the RN receives the demodulation reference signal of the R-PDSCH in the sixth and the seventh OFDM symbols in the first timeslot and in the third and the fourth OFDM symbols in the second timeslot in the sub-frame, performs channel estimation with the demodulation reference signal and demodulates data over the R-PDSCH with the result of channel estimation.

Apparently when there are two OFDM symbols occupied by the R-PDCCH zone, the original two columns of DMRSs in the first timeslot can be reserved, and only the last two columns of reference signals have been translated.

As can be apparent in the technical solution of the invention, the existing two adjacent columns of DMRSs are translated onto OFDM symbols in the R-PDSCH zone, which have no confliction with a common reference signal, when there is no DMRS in the R-PDSCH zone. If there are two columns of DMRSs already in the R-PDSCH zone, i.e., in the scenario as illustrated in FIG. 4A, the last two columns of reference signals are translated forward onto OFDM symbols in the R-PDSCH zone, which have no confliction with a common reference signal.

The Fourth Embodiment

Figure 7A:
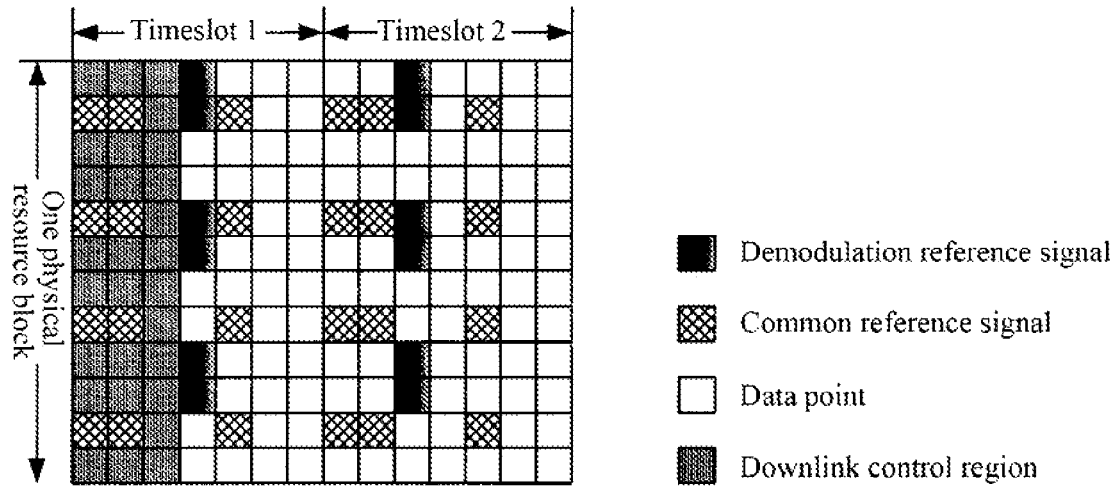
FIG. 7A is a schematic diagram of reference signal configuration in an LTE system according to a fourth embodiment of the invention.

As illustrated in FIG. 7A, which is a schematic diagram of configuration of demodulation reference signal in the CDM-F mode in an LTE system, the CDM-F mode is adopted for the demodulation reference signal of an R-PDSCH, there are three OFDM symbols occupied by an R-PDCCH, and the second timeslot and the last OFDM symbols in the first timeslot in the sub-frame are occupied by the R-PDSCH in the present embodiment.

Figure 7B:
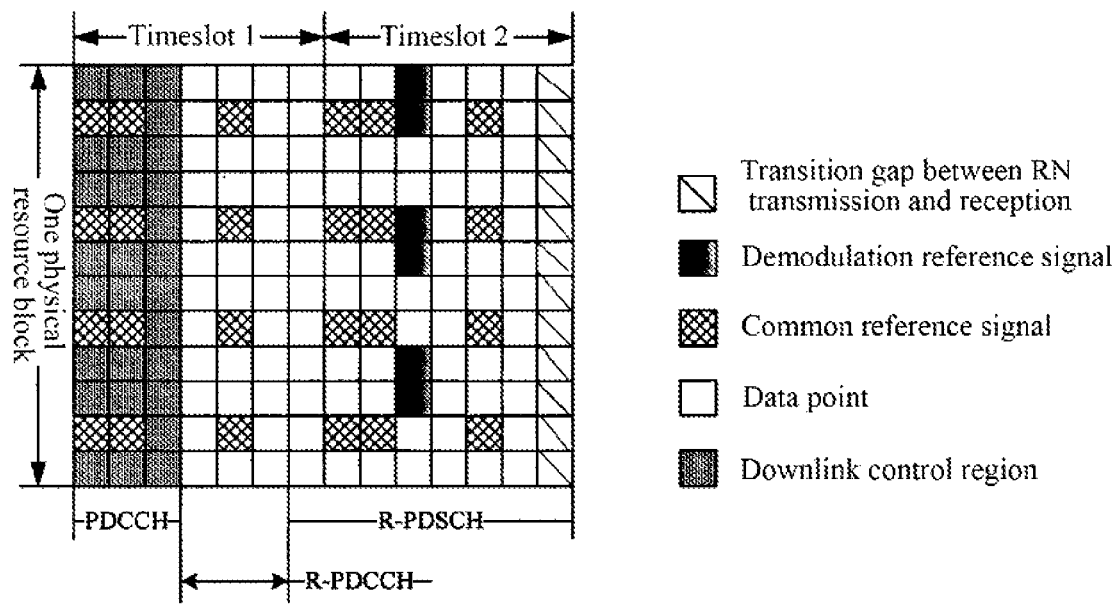
FIG. 7B is a schematic diagram of reference signal configuration in an LTE-A system according to the fourth embodiment of the invention.

The operation S21 is to firstly search a resource zone occupied by the R-PDSCH for resource units in the LTE system for transmission of the demodulation reference signal, which are the third column of resource units in the second timeslot, and then configure the third column of resource units in the second timeslot as resource units for transmission of the demodulation reference signal of the R-PDSCH, as illustrated in FIG. 7B.

In the operation S22, an eNodeB transmits the demodulation reference signal of the R-PDSCH to an RN in the configured resource units.

In the operation S23, the RN receives the demodulation reference signal of the R-PDSCH in the third OFDM symbols in the second timeslot, performs channel estimation with the demodulation reference signal and demodulates data over the R-PDSCH with the result of channel estimation.

The Fifth Embodiment

Figure 8A:
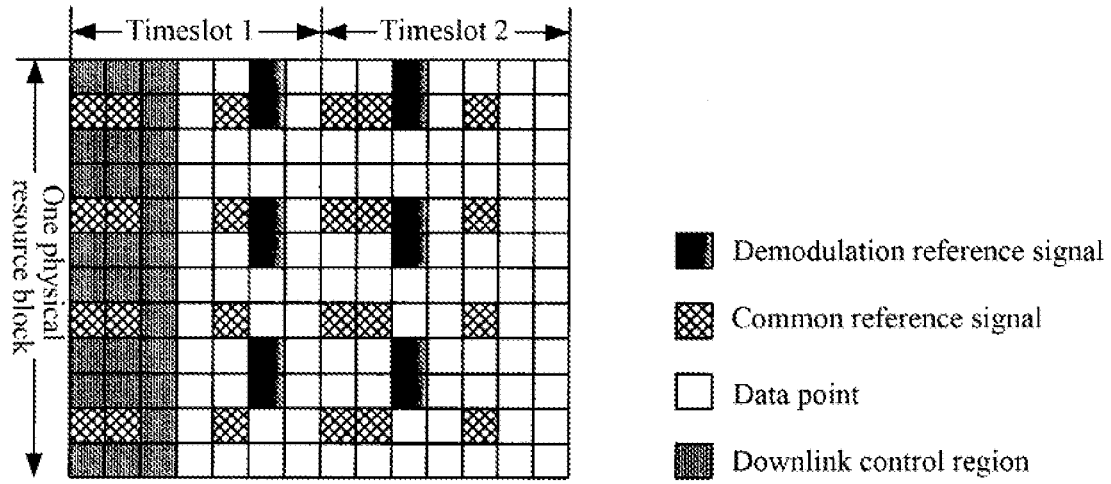
FIG. 8A is a schematic diagram of reference signal configuration in an LTE system according to a fifth embodiment of the invention.
Figure 8B:
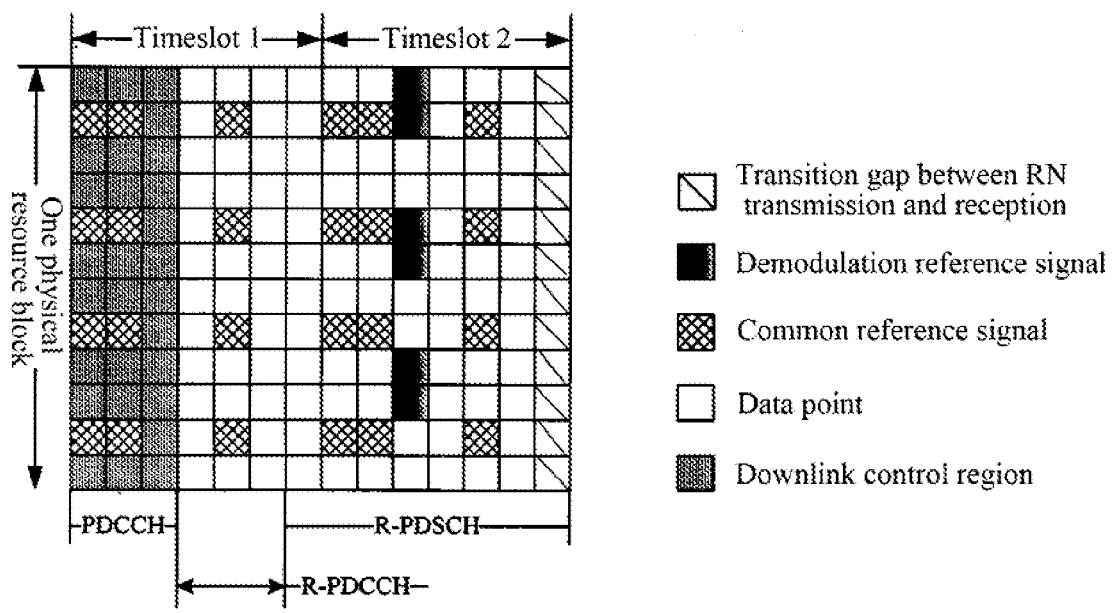
FIG. 8B is a schematic diagram of reference signal configuration in an LTE-A system according to the fifth embodiment of the invention.

As illustrated in FIG. 8A, which is another schematic diagram of configuration of demodulation reference signal in the CDM-F mode in an LTE system, the CDM-F mode is adopted for a demodulation reference signal of an R-PDSCH, there are three OFDM symbols occupied by an R-PDCCH, and the second timeslot and the last OFDM symbols in the first timeslot in the sub-frame are occupied by the R-PDSCH in the present embodiment. As illustrated in FIG. 8B, the result of configuring resource units for transmission of the demodulation reference signal of the R-PDSCH is the same as in the fourth embodiment, and for a specific flow thereof, reference can also be made to the fourth embodiment.

As can be apparent from the fourth embodiment and the fifth embodiment, there are three OFDM symbols occupied by the R-PDCCH, and DMRSs in the R-PDSCH zone can be available to demodulation of the R-PDSCH also with ensured performance. The same process can also be performed when there are two OFDM symbols occupied by the R-PDCCH. Transmission of a reference signal only in the second timeslot will be enough when there are four OFDM symbols occupied by the R-PDCCH. Therefore transmission of a reference signal only in the R-PDSCH zone will be enough in this DMRS mode. Transmission of a DMRS only in the R-PDSCH zone will suffice to satisfy required performance and even achieve better performance regardless of the number of symbols for the R-PDCCH.

In the case that a required density of reference signals in the R-PDSCH zone is satisfied, a part of reference signals may not be transmitted, that is, a smaller number of DMRSs can be transmitted as compared with the existing number of R-PDSCH reference signals, to thereby lower redundancy of the system to the greatest extent while ensuring performance thereof. A backhaul link can be assumed with a stable and good channel quality, so transmission of a smaller number of reference signal points than the existing number of DMRSs will be enough. Specific configuration can be signaled from the eNB to the RN or as specified.

The Sixth Embodiment

Figure 9:
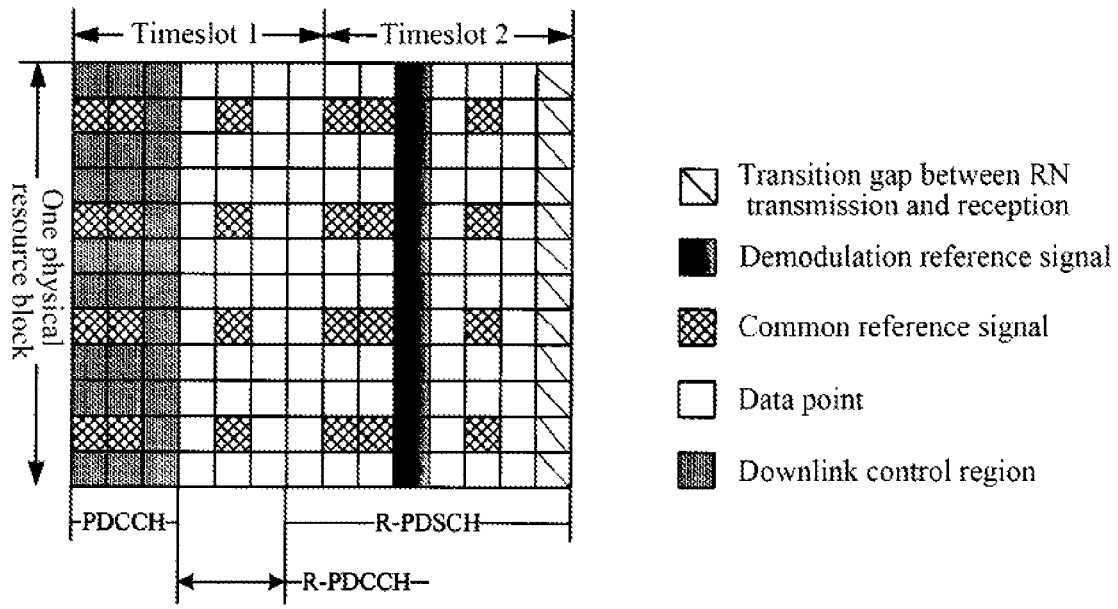
FIG. 9 is a schematic diagram of reference signal configuration according to a sixth embodiment of the invention.

All of the foregoing embodiments are based upon transmission of 2-layer data, and in practice, the invention can also be extended to 3 to 8-layer data. DMRS configuration of up to 8 layers can be supported in the CDM-F in the present embodiment, and as compared with the fourth embodiment or the fifth embodiment, the number of resource units for transmission of the demodulation reference signal of an R-PDSCH will be configured to no less than 8 in the present embodiment in order to support 8-layer data. Therefore, the entire third column of resource units in the second timeslot are configured as resource units for transmission of the demodulation reference signal of the R-PDSCH, as illustrated in FIG. 9.

The Seventh Embodiment

Figure 10:
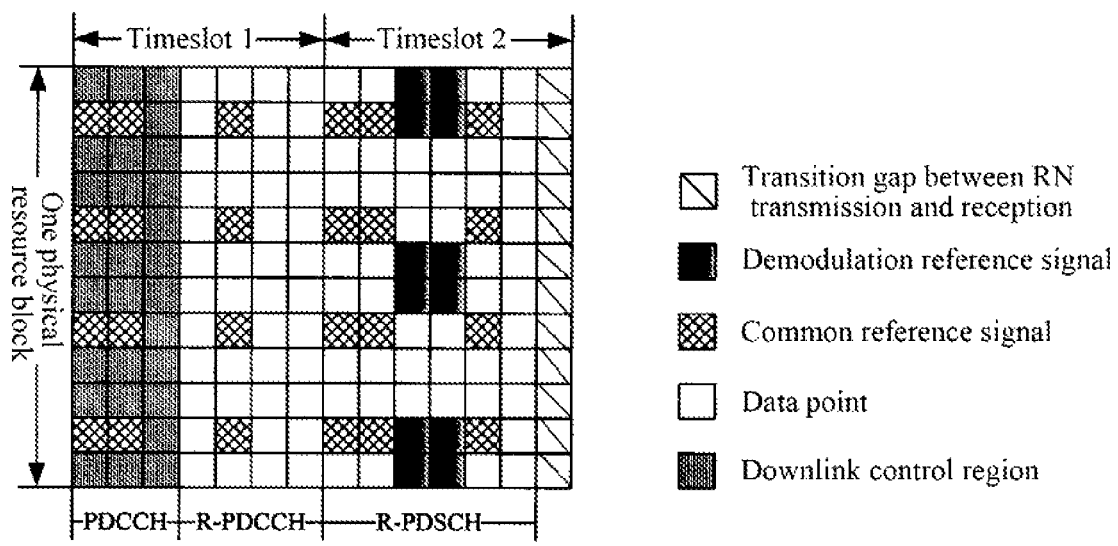
FIG. 10 is a schematic diagram of reference signal configuration according to a seventh embodiment of the invention.

DMRS configuration of up to 8 layers can be supported in the CDM-T in the present embodiment, and as compared with the first embodiment, the number of resource units for transmission of a demodulation reference signal of an R-PDSCH will be configured to no less than 8 in the present embodiment in order to support 8-layer data. Therefore, a row of resource units is added in each of the third column and the fourth column in the second timeslot as resource units for transmission of the demodulation reference signal of the R-PDSCH, as illustrated in FIG. 10.

As can be apparent from the sixth embodiment or the seventh embodiment, the solutions of direct transmission in the CDM-F and of translation and transmission in the CDM-T according to the invention are equally applicable to the scenario where 3 to 8 layers are supported.

The foregoing operation flow at the eNB side is summarized as follows.

Firstly the locations of OFDM symbols in the time domain for transmission of a DMRS are determined.

For a DMRS in the CDM-F mode, a DMRS in the R-PDSCH zone is transmitted for demodulation.

For a DMRS in the CDM-T mode, firstly it is determined whether a DMRS in the current mode can be transmitted in the R-PDSCH zone, and if the first two columns can be transmitted, that is, the number of symbols occupied by the R-PDCCH is less than or equal to 2, the last two columns are translated forward onto OFDM symbols in the R-PDSCH zone, which have no confliction with a common reference signal; or if there is no DMRS in the R-PDSCH zone, that is, the number of symbols for the R-PDCCH is larger than 2, the existing two adjacent columns of DMRSs are translated onto OFDM symbols in the R-PDSCH zone, which have no confliction with a common reference signal.

Then the DMRS is transmitted in the R-PDSCH zone at the determined specific locations.

The operation flow at the RN side is summarized as follows.

Firstly for a DMRS in the CDM-F mode, a DMRS in the R-PDSCH zone is detected for demodulation.

For a DMRS in the CDM-T mode, the number of columns of DMRSs that can be detected is determined from the number of symbols for the R-PDCCH. If the number of symbols occupied by the R-PDCCH is less than or equal to 2, it can be known that the first two columns of DMRSs are reserved and the last two columns of reference signals are translated forward onto OFDM symbols in the R-PDSCH zone, which have no confliction with a common reference signal; or if the number of symbols for the R-PDCCH is larger than 2, it can be known that the existing two adjacent columns of DMRSs are translated onto OFDM symbols in the R-PDSCH zone, which have no confliction with a common reference signal.

Then corresponding detection is performed at the determined locations of the DMRSs.

Figure 11:
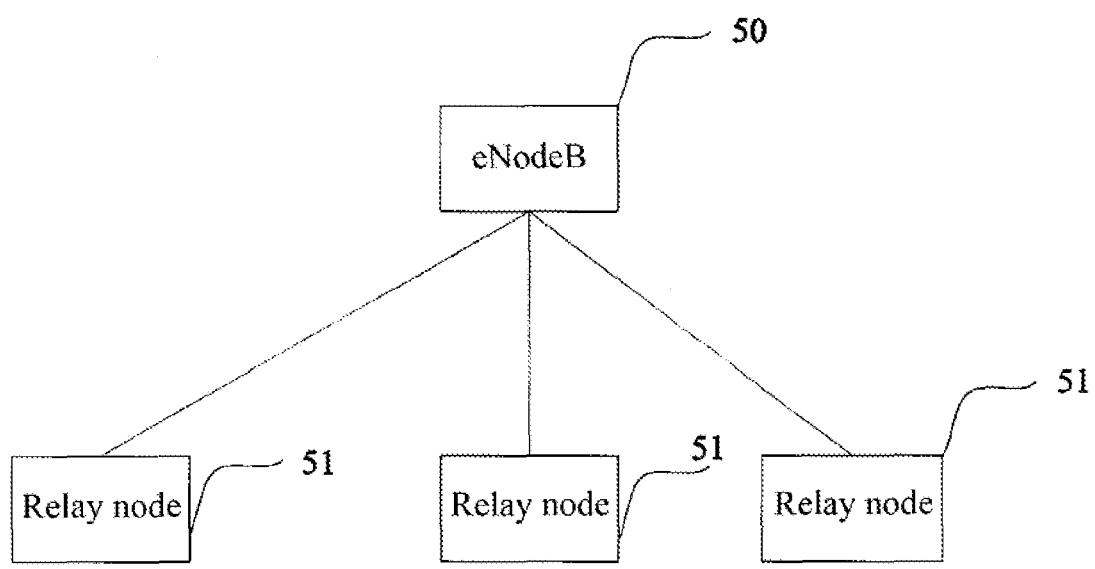
FIG. 11 is a schematic structural diagram of a system according to an embodiment of the invention.

Referring to FIG. 11, an embodiment of the invention further provides an LTE-A communication system including:

an eNodeB 50 configured to select, in a resource zone occupied by an R-PDSCH, preconfigured resource units for transmission of a demodulation reference signal of the R-PDSCH, and transmit the demodulation reference signal to a Relay Node (RN) subordinated to the eNodeB in the selected resource units; and the relay node 51 configured to receive the demodulation reference signal over the resource units, perform channel estimation with the demodulation reference signal and demodulate the R-PDSCH with the result of channel estimation.

The eNodeB 50 is configured to determine the resource zone occupied by the R-PDSCH, select resource units in the resource zone, which are neither occupied by a common reference signal nor located at the last OFDM symbol of the resource zone, and configure the selected resource units as the resource units for transmission of the demodulation reference signal of the R-PDSCH.

The relay node 51 is configured to receive the demodulation reference signal in a part of the resource units in response to an instruction of the eNodeB or under a stored demodulation reference signal point configuration rule.

Figure 12:
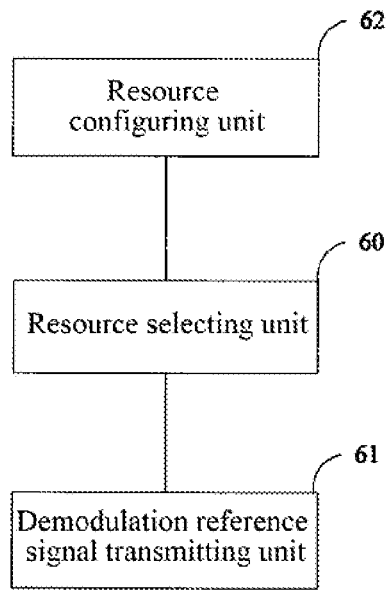
FIG. 12 is a schematic structural diagram of an eNodeB according to an embodiment of the invention.

Referring to FIG. 12, an embodiment of the invention further provides an eNodeB applicable to an LTE-A communication system, and the eNodeB includes:

a resource selecting unit 60 configured to select, in a resource zone occupied by an R-PDSCH, preconfigured resource units for transmission of a demodulation reference signal of the R-PDSCH; and a demodulation reference signal transmitting unit 61 configured to transmit the demodulation reference signal to a Relay Node (RN) subordinated to the eNodeB in the resource units selected by the resource selecting unit.

The eNodeB further includes:

a resource configuring unit 62 configured to determine the resource zone occupied by the R-PDSCH, select resource units in the resource zone, which are neither occupied by a common reference signal nor located at the last OFDM symbol of the resource zone, and configure the selected resource units as the resource units for transmission of the demodulation reference signal of the R-PDSCH.

The resource configuring unit 62 is configured to, when the CDM-F mode is adopted for the demodulation reference signal, search the resource zone for resource units in an Long Term Evolution (LTE) system for transmission of the demodulation reference signal, and select the located resource units as the resource units in the resource zone, which are neither occupied by a common reference signal nor located at the last OFDM symbol of the resource zone.

The resource configuring unit 62 is configured to, when the CDM-T mode is adopted for the demodulation reference signal and the number of OFDM symbols covered by a resource zone occupied by an R-PDCCH is less than or equal to 2, search the resource zone occupied by the R-PDSCH for resource units in an LTE system for transmission of the demodulation reference signal, translate the located resource units at the last two OFDM symbols of the resource zone occupied by the R-PDSCH onto resource units in the resource zone, which are not occupied by a common reference signal, and select the located resource units at the first two OFDM symbols of the resource zone occupied by the R-PDSCH and the translated resource units as the resource units in the resource zone, which are neither occupied by a common reference signal nor located at the last OFDM symbol of the resource zone.

The resource configuring unit 62 is configured to, when the CDM-T mode is adopted for the demodulation reference signal and the number of OFDM symbols covered by a resource zone occupied by an R-PDCCH is larger than 2, search the resource zone occupied by the R-PDSCH for resource units in an LTE system for transmission of the demodulation reference signal, translate the located resource units at the last two OFDM symbols of the resource zone occupied by the R-PDSCH onto resource units in the resource zone, which are not occupied by a common reference signal, and select the translated resource units as the resource units in the resource zone, which are neither occupied by a common reference signal nor located at the last OFDM symbol of the resource zone.

The demodulation reference signal transmitting unit 61 is configured to transmit the demodulation reference signal to the RN in a part of the selected resource units at a preset value of the density of reference signals.

Figure 13:
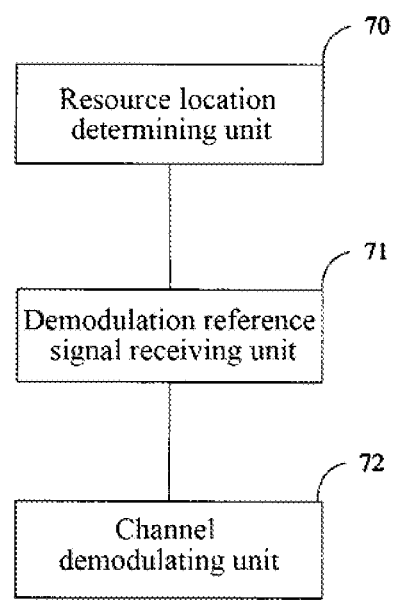
FIG. 13 is a schematic structural diagram of a relay node according to an embodiment of the invention.

Referring to FIG. 13, an embodiment of the invention further provides a relay node applicable to an LTE-A communication system, and the relay node includes:

a resource location determining unit 70 configured to determine locations of resource units in which an eNodeB transmits a demodulation reference signal of an R-PDSCH and which are located in a resource zone occupied by the R-PDSCH;

a demodulation reference signal receiving unit 71 configured to receive the demodulation reference signal at the locations of the resource units; and a channel demodulating unit 72 configured to perform channel estimation with the demodulation reference signal and demodulate the R-PDSCH with the result of channel estimation.

The resource location determining unit 70 is configured to, when the CDM-F mode is adopted for the demodulation reference signal, locate, in the resource zone, resource units in an Long Term Evolution (LTE) system for transmission of the demodulation reference signal, and determine the locations of the located resource units as the locations of the resource units in which the eNodeB transmits the demodulation reference signal of the R-PDSCH.

The resource location determining unit 70 is configured to, when the CDM-T mode is adopted for the demodulation reference signal and the number of OFDM symbols covered by a resource zone occupied by an R-PDCCH is less than or equal to 2, locate, in the resource zone occupied by the R-PDSCH, resource units in an LTE system for transmission of the demodulation reference signal, translate the located resource units at the last two OFDM symbols of the resource zone occupied by the R-PDSCH onto resource units in the resource zone, which are not occupied by a common reference signal, and determine the locations of the located resource units at the first two OFDM symbols of the resource zone occupied by the R-PDSCH and the translated resource units as the locations of the resource units in which the eNodeB transmits the demodulation reference signal.

The resource location determining unit 70 is configured to, when the CDM-T mode is adopted for the demodulation reference signal and the number of OFDM symbols covered by a resource zone occupied by an R-PDCCH is larger than 2, locate, in the resource zone occupied by the R-PDSCH, resource units in an LTE system for transmission of the demodulation reference signal, translate the located resource units at the last two OFDM symbols of the resource zone occupied by the R-PDSCH onto resource units in the resource zone, which are not occupied by a common reference signal, and determine the locations of the translated resource units as the locations of the resource units in which the eNodeB transmits the demodulation reference signal.

The demodulation reference signal receiving unit 71 is configured to receive the demodulation reference signal in a part of the resource units in response to an instruction of the eNodeB or under a stored demodulation reference signal point configuration rule.

In summary, advantageous effects of the invention are as follows.

In the solutions according to the embodiments of the invention, an eNodeB selects, in a resource zone occupied by an R-PDSCH, preconfigured resource units for transmission of a demodulation reference signal of the R-PDSCH and transmits the demodulation reference signal of the R-PDSCH to an RN subordinated to the eNodeB in the selected resource units, and the RN receives the demodulation reference signal of the R-PDSCH in the resource units, performs channel estimation with the demodulation reference signal and demodulates the R-PDSCH with the result of channel estimation, thereby ensuring that the RN can demodulate correctly data over the R-PDSCH for the purpose of receiving correctly the R-PDSCH.

Moreover, in the embodiments of the invention, the eNodeB transmits the demodulation reference signal of the R-PDSCH in the resource units in the R-PDSCH zone that are neither occupied by a common reference signal nor located at the last OFDM symbol of the resource zone, and since transmission of the demodulation reference signal in the first OFDM symbols of the resource zone may result in deteriorated demodulation performance of the R-PDSCH, and the last OFDM symbols of the resource zone shall be spared for a transition gap between data transmission and reception of the RN, thus the foregoing selection of resource units can ensure demodulation performance of the R-PDSCH over a backhaul link without any influence upon the existing LTE system specification.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

What is claimed is:

1. A method for transmitting a demodulation reference signal over a backhaul link in a Long Term Evolution-Advanced, LTE-A, system, comprising:

selecting, by an eNodeB in a resource zone occupied by a Relay-Physical Downlink Shared Channel, R-PDSCH, over the backhaul link, preconfigured resource units for transmission of a demodulation reference signal of the R-PDSCH; and transmitting, by the eNodeB, the demodulation reference signal to a Relay Node, RN, subordinated to the eNodeB in the selected resource units, wherein configuring the resource units for transmission of the demodulation reference signal of the R-PDSCH comprises:

determining the resource zone occupied by the R-PDSCH;

selecting resource units in the resource zone, which are neither occupied by a common reference signal nor located at a last OFDM symbol of the resource zone; and configuring the selected resource units as the resource units for transmission of the demodulation reference signal of the R-PDSCH;

wherein in a case that a Code Division Multiplexing-Time, CDM-T, mode is adopted for the demodulation reference signal and a number of OFDM symbols covered by a resource zone occupied by a Relay-Physical Downlink Control Channel, R-PDCCH, over the backhaul link is less than or equal to 2, and wherein the selecting the resource units in the resource zone, which are neither occupied by the common reference signal nor located at the last OFDM symbol of the resource zone comprises:

searching the resource zone occupied by the R-PDSCH for resource units in an LTE system for transmission of the demodulation reference signal;

translating the located resource units at last two OFDM symbols of the resource zone occupied by the R-PDSCH onto resource units in the resource zone occupied by the R-PDSCH, which are not occupied by the common reference signal; and selecting the located resource units at first two OFDM symbols of the resource zone occupied by the R-PDSCH and the translated resource units as the resource units in the resource zone, which are neither occupied by the common reference signal nor located at the last OFDM symbol of the resource zone;

or wherein in a case that a Code Division Multiplexing-Time, CDM-T, mode is adopted for the demodulation reference signal and a number of OFDM symbols covered by a resource zone occupied by a Relay-Physical Downlink Control Channel, R-PDCCH, over the backhaul link is larger than 2, and wherein the selecting the resource units in the resource zone, which are neither occupied by the common reference signal nor located at the last OFDM symbol of the resource zone comprises:

searching the resource zone occupied by the R-PDSCH for resource units in an LTE system for transmission of the demodulation reference signal;

translating the located resource units at last two OFDM symbols of the resource zone occupied by the R-PDSCH onto resource units in the resource zone occupied by the R-PDSCH, which are not occupied by the common reference signal; and selecting the translated resource units as the resource units in the resource zone, which are neither occupied by the common reference signal nor located at the last OFDM symbol of the resource zone.

2. The method according to claim 1, wherein in a case that a Code Division Multiplexing-Frequency, CDM-F, mode is adopted for the demodulation reference signal, and selecting the resource units in the resource zone, which are neither occupied by the common reference signal nor located at the last OFDM symbol of the resource zone comprises:

searching the resource zone for resource units in an Long Term Evolution, LTE, system for transmission of the demodulation reference signal; and selecting the located resource units as the resource units in the resource zone, which are neither occupied by the common reference signal nor located at the last OFDM symbol of the resource zone.

3. The method according to claim 2, wherein the resource units for transmission of the demodulation reference signal of the R-PDSCH comprises:

resource units consisted of third OFDM symbols in a second timeslot of a sub-frame where the resource zone is located.

4. The method according to claim 1, wherein in a case that the CDM-T mode is adopted for the demodulation reference signal and the number of OFDM symbols covered by a resource zone occupied by a R-PDCCH over the backhaul link is less than or equal to 2 and wherein the resource units for transmission of the demodulation reference signal of the R-PDSCH comprises:

resource units consisted of the sixth OFDM symbols and the seventh OFDM symbols in a first timeslot of a sub-frame where the resource zone occupied by the R-PDSCH is located, and resource units consisted of third OFDM symbols and fourth OFDM symbols in a second timeslot of the sub-frame.

5. The method according to claim 1, wherein in a case that the CDM-T mode is adopted for the demodulation reference signal and the number of OFDM symbols covered by a resource zone occupied by a R-PDCCH over the backhaul link is larger than 2 and wherein the resource units for transmission of the demodulation reference signal of the R-PDSCH comprises:

resource units consisted of third OFDM symbols and fourth OFDM symbols in a second timeslot of a sub-frame where the resource zone occupied by the R-PDSCH is located.

6. The method according to claim 1, wherein transmitting by the eNodeB the demodulation reference signal to the RN subordinated to the eNodeB in the selected resource units comprises:

transmitting, by the eNodeB, the demodulation reference signal to the RN in a part of the selected resource units at a preset value of a density of reference signals.

7. A method for demodulating a channel over a backhaul link in a Long Term Evolution-Advanced, LTE-A, system, comprising:

determining, by a Relay Node, RN, locations of resource units in which an eNodeB transmits a demodulation reference signal of a Relay-Physical Downlink Shared Channel, R-PDSCH, and which are located in a resource zone occupied by the R-PDSCH, and receiving the demodulation reference signal at the locations; and performing, by the RN, channel estimation with the demodulation reference signal and demodulating the R-PDSCH with a result of channel estimation, wherein the resource units in which the eNodeB transmits the demodulation reference signal of the R-PDSCH comprise:

resource units in the resource zone, which are neither occupied by a common reference signal nor located at a last OFDM symbol of the resource zone;

wherein in a case that a Code Division Multiplexing-Time, CDM-T, mode is adopted for the demodulation reference signal and the number of OFDM symbols covered by a resource zone occupied by a Relay-Physical Downlink Control Channel, R-PDCCH, over the backhaul link is less than or equal to 2, determining by the RN the locations of the resource units in which the eNodeB transmits the demodulation reference signal of the R-PDSCH comprises:

locating, in the resource zone occupied by the R-PDSCH, resource units in an LTE system for transmission of the demodulation reference signal;

translating the located resource units at last two OFDM symbols of the resource zone occupied by the R-PDSCH onto resource units in the resource zone occupied by the R-PDSCH, which are not occupied by a common reference signal; and determining locations of the located resource units at first two OFDM symbols of the resource zone occupied by the R-PDSCH and the translated resource units as the locations of the resource units in which the eNodeB transmits the demodulation reference signal;

or wherein in a case that a Code Division Multiplexing-Time, CDM-T, mode is adopted for the demodulation reference signal and the number of OFDM symbols covered by a resource zone occupied by a Relay-Physical Downlink Control Channel, R-PDCCH, over the backhaul link is larger than 2, determining by the RN the locations of the resource units in which the eNodeB transmits the demodulation reference signal of the R-PDSCH comprises:

locating, in the resource zone occupied by the R-PDSCH, resource units in an LTE system for transmission of the demodulation reference signal;

translating the located resource units at last two OFDM symbols of the resource zone occupied by the R-PDSCH onto resource units in the resource zone occupied by the R-PDSCH, which are not occupied by a common reference signal; and determining locations of the translated resource units as the locations of the resource units in which the eNodeB transmits the demodulation reference signal.

8. The method according to claim 7, wherein in a case that a Code Division Multiplexing-Frequency, CDM-F, mode is adopted for the demodulation reference signal, and determining by the RN the locations of the resource units in which the eNodeB transmits the demodulation reference signal of the R-PDSCH comprises:

locating, in the resource zone, resource units in an Long Term Evolution, LTE, system for transmission of the demodulation reference signal; and determining locations of the resource units in the LTE system as the locations of the resource units in which the eNodeB transmits the demodulation reference signal of the R-PDSCH.

9. The method according to claim 7, wherein receiving the demodulation reference signal at the locations comprises:

receiving, by the RN, the demodulation reference signal in a part of the resource units in response to an instruction of the eNodeB or under a stored demodulation reference signal point configuration rule.

10. A relay node, comprising a memory and a processor, wherein the memory stores program code, and wherein the program code is executable by the processor to implement:

a resource location determining unit configured to determine locations of resource units in which an eNodeB transmits a demodulation reference signal of a Relay-Physical Downlink Shared Channel, R-PDSCH, and which are located in a resource zone occupied by the R-PDSCH;

a demodulation reference signal receiving unit configured to receive the demodulation reference signal at the locations of the resource units; and a channel demodulating unit configured to perform channel estimation with the demodulation reference signal and demodulate the R-PDSCH with a result of channel estimation, wherein the resource units in which the eNodeB transmits the demodulation reference signal of the R-PDSCH comprise:

resource units in the resource zone, which are neither occupied by a common reference signal nor located at a last OFDM symbol of the resource zone;

wherein the resource location determining unit is configured to, when a Code Division Multiplexing-Time, CDM-T, mode is adopted for the demodulation reference signal and the number of OFDM symbols covered by a resource zone occupied by a Relay-Physical Downlink Control Channel, R-PDCCH, over a backhaul link is less than or equal to 2, locate, in the resource zone occupied by the R-PDSCH, resource units in an LTE system for transmission of the demodulation reference signal;

translate the located resource units at last two OFDM symbols of the resource zone occupied by the R-PDSCH onto resource units in the resource zone occupied by the R-PDSCH, which are not occupied by a common reference signal; and determine locations of the located resource units at first two OFDM symbols of the resource zone occupied by the R-PDSCH and the translated resource units as the locations of the resource units in which the eNodeB transmits the demodulation reference signal;

or wherein the resource location determining unit is configured to, when a Code Division Multiplexing-Time, CDM-T, mode is adopted for the demodulation reference signal and the number of OFDM symbols covered by a resource zone occupied by a Relay-Physical Downlink Control Channel, R-PDCCH, over a backhaul link is larger than 2, locate, in the resource zone occupied by the R-PDSCH, resource units in an LTE system for transmission of the demodulation reference signal;

translate the located resource units at last two OFDM symbols of the resource zone occupied by the R-PDSCH onto resource units in the resource zone occupied by the R-PDSCH, which are not occupied by a common reference signal; and determine locations of the translated resource units as the locations of the resource units in which the eNodeB transmits the demodulation reference signal.

11. The relay node according to claim 10, wherein the resource location determining unit is configured to, when a Code Division Multiplexing-Frequency, CDM-F, mode is adopted for the demodulation reference signal, locate, in the resource zone, resource units in an Long Term Evolution, LTE, system for transmission of the demodulation reference signal; and determine locations of the resource units in the LTE systems as the locations of the resource units in which the eNodeB transmits the demodulation reference signal of the R-PDSCH.

12. The relay node according to claim 10, wherein the demodulation reference signal receiving unit is configured to receive the demodulation reference signal in a part of the resource units in response to an instruction of the eNodeB or under a stored demodulation reference signal point configuration rule.

* * * * *